(12) United States Patent
Prabhudesai et al.

(10) Patent No.: US 12,211,296 B2
(45) Date of Patent: *Jan. 28, 2025

(54) SYSTEM FOR AUTOMATIC TUMOR DETECTION AND CLASSIFICATION

(71) Applicant: Applied Materials, Inc., Santa Clara, CA (US)

(72) Inventors: Parijat Prakash Prabhudesai, Bengaluru (IN); Ganesh Kumar Mohanur Raghunathan, Bengaluru (IN); Sumit Kumar Jha, Bangalore (IN); Aditya Sista, Bengaluru (IN); Narasimha Murthy Chandan, Bengaluru (IN)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,655

(22) Filed: Jun. 12, 2023

(65) Prior Publication Data

US 2023/0394853 A1 Dec. 7, 2023

Related U.S. Application Data

(60) Continuation of application No. 17/236,739, filed on Apr. 21, 2021, now Pat. No. 11,688,188, which is a (Continued)

(30) Foreign Application Priority Data

Aug. 30, 2018 (IN) .............................. 201841032562

(51) Int. Cl.
*G06V 20/69* (2022.01)
*G06N 20/00* (2019.01)
(Continued)

(52) U.S. Cl.
CPC .......... *G06V 20/698* (2022.01); *G06N 20/00* (2019.01); *G06T 7/0012* (2013.01); *G06N 3/02* (2013.01);
(Continued)

(58) Field of Classification Search
CPC ........ G06V 20/698; G06N 20/00; G06N 3/02; G06T 7/0012; G06T 7/11; G06T 2207/20081; G06T 2207/30024
See application file for complete search history.

(56) References Cited

U.S. PATENT DOCUMENTS

| 7,529,394 B2 | 5/2009 | Krishnan et al. |
| 9,589,374 B1 | 3/2017 | Gao et al. |

(Continued)

FOREIGN PATENT DOCUMENTS

| CN | 106355023 A | 1/2017 |
| CN | 106875393 A | 6/2017 |

(Continued)

OTHER PUBLICATIONS

International Search Report and Written Opinion for International Application No. PCT/US2019/048401 dated Jan. 21, 2020.
(Continued)

*Primary Examiner* — Utpal D Shah
(74) *Attorney, Agent, or Firm* — Patterson + Sheridan, LLP

(57) ABSTRACT

Certain aspects of the present disclosure provide techniques for automatically detecting and classifying tumor regions in a tissue slide. The method generally includes obtaining a digitized tissue slide from a tissue slide database and determining, based on output from a tissue classification module, a type of tissue of shown in the digitized tissue slide. The method further includes determining, based on output from a tumor classification model for the type of tissue, a region
(Continued)

of interest (ROI) of the digitized tissue slide and generating a classified slide showing the ROI of the digitized tissue slide and an estimated diameter of the ROI. The method further includes displaying on an image display unit, the classified slide and user interface (UI) elements enabling a pathologist to enter input related to the classified slide.

15 Claims, 5 Drawing Sheets

Related U.S. Application Data division of application No. 16/553,562, filed on Aug. 28, 2019, now Pat. No. 11,017,207.

(51) Int. Cl.
*G06T 7/00* (2017.01)
*G06T 7/11* (2017.01)
*G06N 3/02* (2006.01)

(52) U.S. Cl.
CPC ....... *G06T 7/11* (2017.01); *G06T 2207/20081* (2013.01); *G06T 2207/30024* (2013.01)

(56) References Cited

U.S. PATENT DOCUMENTS

| | | | | |
|---|---|---|---|---|
| 9,946,953 | B2* | 4/2018 | Tunstall | G06T 7/0014 |
| 10,019,656 | B2* | 7/2018 | Huang | G06V 10/806 |
| 10,127,433 | B2* | 11/2018 | Ascierto | G06T 7/0012 |
| 10,565,430 | B2* | 2/2020 | Lloyd | G16H 30/20 |
| 2010/0104513 | A1* | 4/2010 | Rittscher | G06T 7/0012 424/9.1 |
| 2010/0111396 | A1* | 5/2010 | Boucheron | G06F 18/29 382/133 |
| 2012/0033861 | A1 | 2/2012 | Dai et al. | |
| 2012/0147010 | A1* | 6/2012 | Schmidt | G06T 11/206 345/440 |
| 2013/0034279 | A1 | 2/2013 | Cosatto et al. | |
| 2013/0243287 | A1* | 9/2013 | Thomson | G06T 7/11 382/128 |
| 2014/0018681 | A1 | 1/2014 | Chang et al. | |
| 2014/0233826 | A1* | 8/2014 | Agaian | G06V 20/698 382/133 |
| 2014/0267671 | A1 | 9/2014 | Kenny et al. | |
| 2014/0301619 | A1* | 10/2014 | Stavros | A61B 5/0035 382/131 |
| 2015/0003716 | A1 | 1/2015 | Lloyd et al. | |
| 2015/0279032 | A1 | 10/2015 | Hall et al. | |
| 2016/0042511 | A1* | 2/2016 | Chukka | G06V 20/695 382/133 |
| 2016/0063724 | A1* | 3/2016 | Tunstall | G06T 7/136 382/128 |
| 2016/0070949 | A1* | 3/2016 | Tunstall | G06V 20/69 382/133 |
| 2016/0253466 | A1* | 9/2016 | Agaian | G06N 5/043 382/128 |
| 2016/0335478 | A1* | 11/2016 | Bredno | A61B 34/74 |
| 2017/0086674 | A1 | 3/2017 | Keefer | |
| 2017/0270346 | A1* | 9/2017 | Ascierto | G06T 7/0012 |
| 2017/0330320 | A1* | 11/2017 | Lynch | G16H 30/40 |
| 2017/0352157 | A1* | 12/2017 | Madabhushi | G16H 30/40 |
| 2018/0372642 | A1* | 12/2018 | Yoshihara | G06V 10/761 |
| 2019/0042826 | A1* | 2/2019 | Chang | G06T 7/11 |
| 2019/0287240 | A1* | 9/2019 | Gaire | G06T 7/0012 |
| 2020/0035350 | A1* | 1/2020 | Sullivan | G06N 20/00 |
| 2020/0097727 | A1* | 3/2020 | Stumpe | G02B 21/361 |
| 2020/0302603 | A1* | 9/2020 | Barnes | G06T 7/0012 |
| 2020/0342597 | A1* | 10/2020 | Chukka | G06V 20/698 |
| 2020/0364867 | A1* | 11/2020 | Georgescu | G06F 18/24133 |
| 2021/0018742 | A1* | 1/2021 | Stumpe | G06T 7/62 |
| 2021/0027462 | A1* | 1/2021 | Bredno | G06T 7/0012 |

FOREIGN PATENT DOCUMENTS

| | | |
|---|---|---|
| CN | 107798673 A | 3/2018 |
| CN | 106897573 B | 4/2018 |
| JP | 2014-235494 A | 12/2014 |
| JP | 2016-514869 A | 5/2016 |
| KR | 10-2015-0059860 A | 6/2015 |
| TW | 514513 B | 12/2002 |
| TW | 200616588 A | 6/2006 |
| WO | 2018/076023 A1 | 4/2018 |
| WO | 2018115055 A1 | 6/2018 |

OTHER PUBLICATIONS

Taiwan Office Action dated Sep. 11, 2020, for Taiwan Patent Application No. 108130964.
Taiwan Office Action dated Mar. 8, 2021, for Taiwan Patent Application No. 108130964.
Indian Office Action dated Mar. 3, 2022, for Indian Patent Application No. 202147012401.
Extended European Search Report for European Application No. 855176.4 dated Apr. 11, 2022.
Japanese Office Action dated Jul. 5, 2022, for Japanese Patent Application No. 2021-51094.
Office Action for Korean Application No. 10-2021-7008929 dated Sep. 23, 2022.
Chinese Office Action dated Mar. 27, 2024, for Chinese Patent Application No. 201980054424.7.
Office Action in related application EP 19 855 176.4 dated May 24, 2024.

* cited by examiner

SYSTEM FOR AUTOMATIC TUMOR DETECTION AND CLASSIFICATION

CROSS-REFERENCE TO RELATED APPLICATIONS

This application is a continuation of U.S. Nonprovisional patent application Ser. No. 17/236,739, filed Apr. 21, 2021, which is a divisional of U.S. Nonprovisional patent application Ser. No. 16/553,562, filed Aug. 28, 2019, which claims benefit of Indian Provisional Patent Application No. 201841032562, filed Aug. 30, 2018, all of which are herein incorporated by reference in their entirety.

BACKGROUND

Aspects of the present disclosure relate to machine learning and in particular to the classification of images using machine learning pattern recognition.

Currently, the process of diagnosis for a particular slide containing potentially cancerous tissue is time consuming and intensive for pathologists performing the diagnosis. In the current process, a pathologist has to manually analyze many images of tissue slides. Each individual slide is typically scanned in across multiple magnification and zoom levels. As a result, in order to determine if a given tissue does or does not include a tumor can take a good deal of time for the slides representing one tissue. Further, if the pathologist detects a tumor, further time is necessary to analyze the tumor. In all, the identification and analysis of a single tumor typically takes at least two and half hours of the pathologist's time. And, many times, a pathologist is not convinced by his own diagnosis, and so may send the slides to a second pathologist, which will at least double the time needed for complete analysis.

In some cases, the abundance of tissues that need to be analyzed with the relative scarcity of qualified pathologists means that a pathologist's time is at a premium. In such cases, it may take days to get the slides to the pathologist before analysis even begins. In order to speed the analysis of tissue slides, analysis via machine learning may be implemented. However, existing machine learning systems are incapable of effectively identifying and classifying tumors depicted in tissue slides. Further, existing systems are incapable of properly annotating or marking tissue slides to assist the pathologist in diagnosis. As a result, none or only very little pathologist time may be effectively saved by existing machine learning systems. Therefore, methods and systems for the automatic detection and classification are needed which avoid the issues of existing systems.

BRIEF SUMMARY

Certain embodiments provide a method for automatically detecting and classifying tumor regions in a tissue slide. The method generally includes obtaining a digitized tissue slide from a tissue slide database and determining, based on output from a tissue classification module, a type of tissue of shown in the digitized tissue slide. The method further includes determining, based on output from a tumor classification model for the type of tissue, a region of interest (ROI) of the digitized tissue slide, wherein the ROI corresponds to a section of the digitized tissue slide determined to be a tumor by the tumor classification model and generating a classified slide showing the ROI of the digitized tissue slide and an estimated diameter of the ROI. The method further includes displaying on an image display unit, the classified slide and user interface (UI) elements enabling a pathologist to enter input related to the classified slide.

Another embodiment provides a method for automatically detecting and classifying tumor regions in a tissue slide by a tumor classification module. The method generally includes receiving from a pathologist assistance system, a digitized tissue slide and generating a binary mask, wherein the binary mask indicates a region of interest (ROI) in the digitized tissue slide. The method further includes determining a diameter of the ROI based on an ellipse fitted to match the ROI and sorting the ROI into a tumor class based on the diameter of the ROI, wherein the tumor class indicates a stage of tumors in the tumor class. The method further includes generating, based on the ROI, a classified slide, wherein the classified slide shows each ROI as color-coded based on the tumor class associated with each ROI and transmitting, to the pathologist assistance system, the classified slide.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
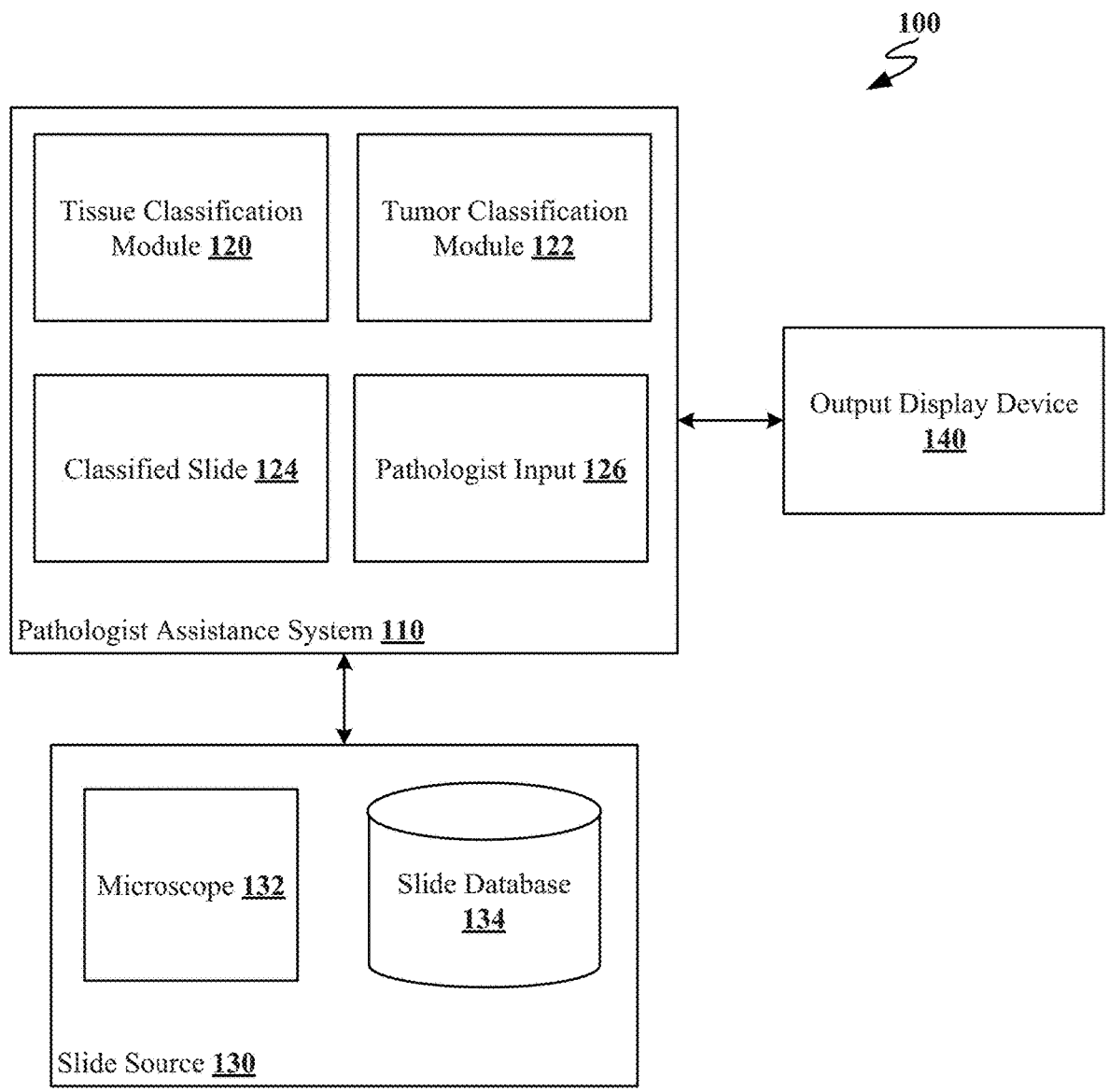
FIG. 1 depicts an example computing environment for the automatic detection and classification of tumors.

FIG. 1 depicts an example computing environment 100 for the automatic detection and classification of tumors. As shown, computing environment 100 includes pathologist assistance system 110, slide source 130 and output display device 140. Although shown as separate entities, in other examples the functions of pathologist assistance system 110, slide source 130 and output display device 140 may be performed by a single computing device or by a distributed computing system. In other embodiments, pathologist assistance system 110, slide source 130 and output display device 140 may be connected via a network such as, for example, a local area network (LAN), a wide area network (WAN) or the Internet.

Pathologist assistance system 110 is a computing device comprising at least a processor and a memory, capable of executing software resident in the memory by the processor. Pathologist assistance system 110 includes tissue classification module 120, tumor classification module 122, classified slide 124 and pathologist input 126. Tissue classification module 120 is a software object including a machine learning model employing pattern recognition, which can be used to identify a type of tissue depicted in a digital slide. The digital slide is obtained from slide source 130. Slide source 130 is a variety of digital slide collection and storage implements available to pathologist assistance system 110. Slide source 130 includes microscope 132 and slide database 134. Microscope 132 is an electronic microscope capable of creating digital images of tissue slides at various resolutions and zoom levels, which may be beneficial to the diagnosis process. Microscope 132 may be any suitable electronic microscope, such as an optical microscope, a fluorescence microscope, an electron microscope or a probe microscope, and may make use of various spectral imaging techniques, such as multispectral imaging or hyperspectral imaging. The digital images created by microscope 132 are stored in slide database 134. Slide database 134 is a storage database including a plurality of digital slide images organized by slides based on unique ID, such as a particular tissue. It is possible to access from slide database 134 all tissue slides from a given tissue, at all sizes, resolutions and zoom levels.

Tissue classification module 120 includes a tissue classification model trained using labeled images of human tissue. In other examples, tissue classification module 120 may be used to classify other types of tissues, such as animal tissue. In such examples, tissue classification module 120 may be trained using labeled images of animal tissue. The object of the tissue classification model is to identify the type of tissue depicted in a slide rather than identifying any particular tumorous regions depicted in a slide. Once the tissue classification model identifies the type of tissue depicted in a given slide, tissue classification module 120 verifies that a tumor classification model for that type of tissue exists, and passes the given slide onto tumor classification module 122.

Tumor classification module 122 is a software object including a plurality of machine learning classification models that can be used to detect and classify tumors within a particular type of tissue. Many different types of tissues may be analyzed for tumors, and the analysis may be different for each type of tissue. For example, analysis of breast tissue may be different than analysis of pancreas tissue, and so on. As a result, classification a different tumor classification model may be used for each type of tissue analyzed for tumors. In this example, tumor classification module 122 includes at least a tumor classification model for the type of tissue identified by tissue classification module 120.

Each tumor classification model of tumor classification module 122 is a machine learning model capable of identifying regions of a digital slide image corresponding to tumors in tissue. For example, the tumor classification models may be convolutional neural network (CNN) models. CNN models are trained using machine learning algorithms modelled after the neurons of the human brain.

To train a machine learning model, such as a CNN model, training data is supplied to a machine learning model to produce output. A machine learning model typically has a set of initialization parameters that affect how the machine learning model processes data. The training data typically has a ground truth (e.g., known value) classification. The output is typically evaluated relative to this ground truth. The result of this evaluation can be used to adjust or update the parameter of the machine learning model so that on a subsequent run the machine learning model produces more accurate output. Once sufficiently trained, the machine learning model accepts input in the same form as the data used to train the machine learning model and produces output based on that input. CNN models that are used to perform classification on visual images are trained using training data consisting of labeled images. In this example, the training data may be digital image slides previously diagnosed by a qualified pathologist.

Tumor classification module 122 analyzes the slide to detect any potentially tumorous regions depicted in the slide. Potentially tumorous regions are called regions of interest (ROI). In general, the process for tumor classification by tumor classification module 122 starts with using a tumor classification model for the type of tissue identified by tissue classification module 120 to create a binary mask to identify ROI. The binary mask filters the image to only the continuous areas of cancerous cells shown in the slide. These continuous areas correspond to ROI. Once this information is received, tumor classification module 122 then determines the size of each ROI. Tumor classification module 122 then sorts the ROI, based on size, into various tumor classes corresponding to tumor stages. Tumor classification module 122 then color codes the ROI based on the associated tumor stages. The result of these processes by tumor classification module 122 is classified slide 124, which is an altered version of the slide analyzed to show color coded ROI.

Once classified slide 124 is generated, pathologist assistance system 110 displays classified slide 124 via output display device 140. Output display device 140 is a device including at least a display which can be used to present screens or other information to a user of output display device 140. Output display device 140 may be a separate computing device from pathologist assistance system 110 or may be a screen, monitor or display acting as an output device for pathologist assistance system 110.

Once displayed, the pathologist is able to determine if the identifications and classifications made by tumor classification module 122 are correct. If so, pathologist assistance system 110 stores classified slide 124. If the pathologist determines classified slide 124 is not correct, user interface (UI) element provided to the pathologist via output display device 140 enable the pathologist to enter corrections and modifications to the detection, sizing or staging of the ROI shown in classified slide 124. In such a case, pathologist assistance system 110 uses the corrections and modifications to update the tumor classification model used to identify the ROI and improve subsequent output from that tumor classification model.

Figure 2:
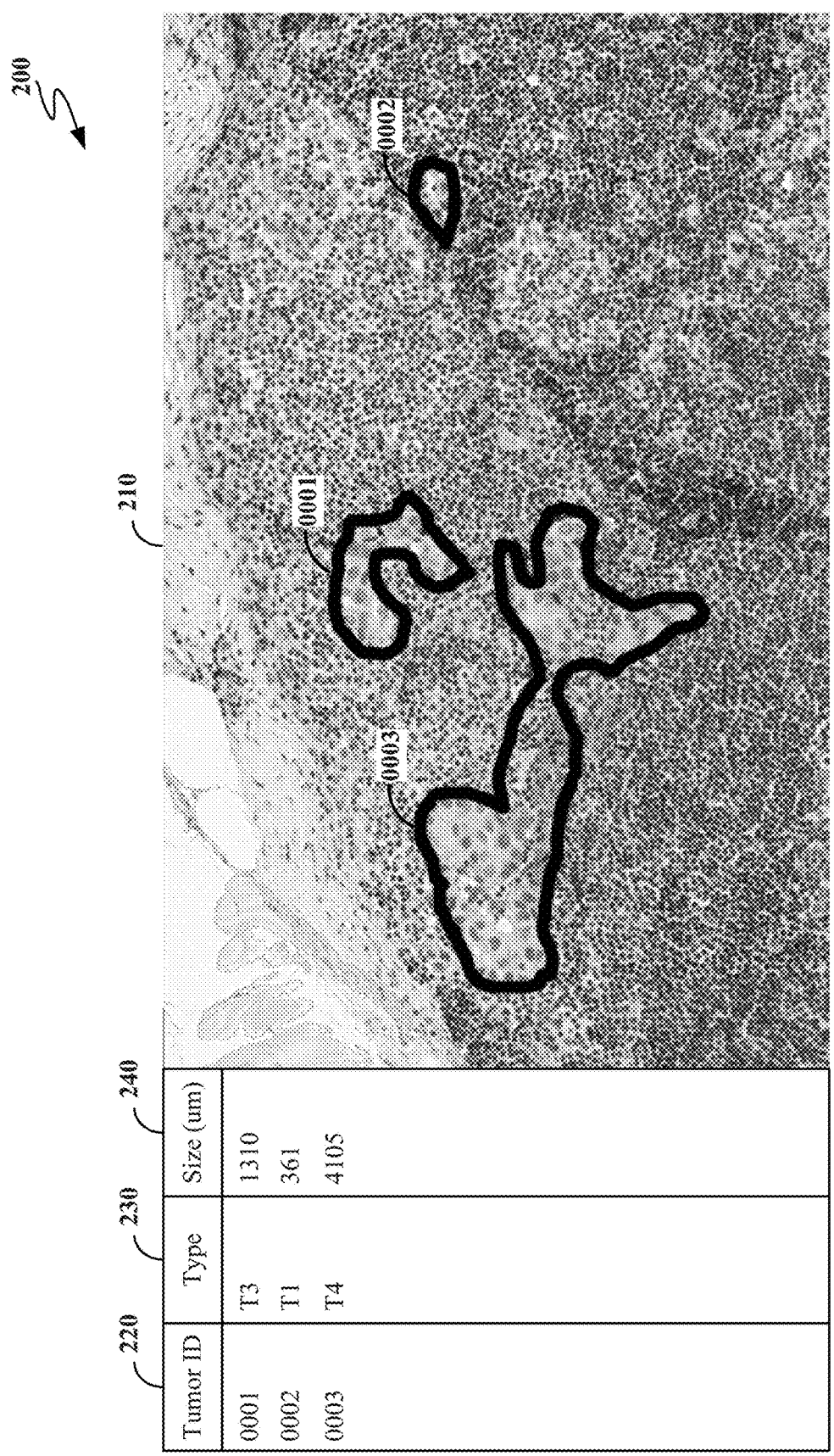
FIG. 2 depicts an example user interface for presenting a classified slide.

FIG. 2 depicts an example user interface 200 for presenting a classified slide 210. Classified slide 210 shows three ROI, marked as 0001-0003. These numbers correspond with the tumor ID shown for each ROI at box 220. Box 230 shows a type or tumor class for each ROI, corresponding to a determined stage for each ROI.

Staging for a ROI is typically based on the size of the ROI. In this example, the size of each ROI is determined by the diameter of the ROI. In this example, the diameter is measured as the distance between the points in a ROI that are furthest from each other. For example, a tumor classification model may lay an ellipse over a ROI until the ellipse is at the smallest possible state while still covering the entire ROI. The longer axis of the ellipse may then be used as the diameter for the ROI. The diameters of the ROI of classified slide 210 are shown at box 240.

In general, user interface 200 is an example of a presentation of classified slide 210 to a pathologist using a pathologist assistance system. In some embodiments, user interface 200 may provide additional UI elements enabling the pathologists to make corrections to classified slide 210. For example, the pathologist may be able to redraw the lines shown around the ROI if the pathologist believes classified slide 210 has improperly sized the ROI. The pathologist may also be able to indicate that a ROI is completely incorrect, or draw a line around a region of classified slide 210 where a ROI should be shown but is not. Depending on the output device used, various input devices may be used by the pathologist to make corrections or modifications to classified slide 210. For example, a touch screen enabled device (such as a smartphone or tablet) may enable touch sensitive controls, while a device with a mouse and keyboard may instead provide mouse and keyboard controls for input.

Figure 3:
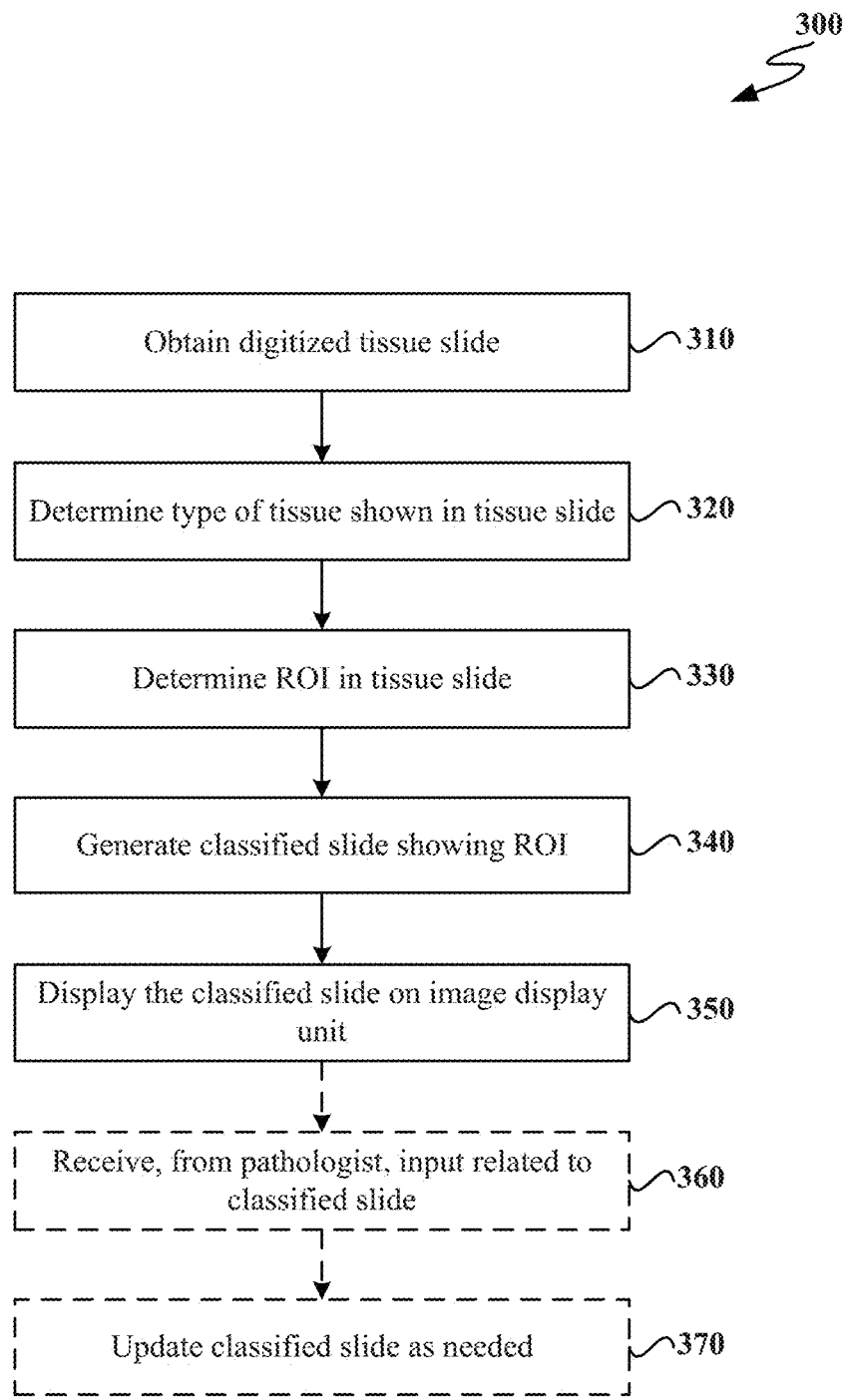
FIG. 3 is a flow chart of an example method for automatically detecting and classifying tumor regions in a tissue slide.

FIG. 3 is a flow chart of an example method 300 for automatically detecting and classifying tumor regions in a tissue slide. Method 300 may be performed by a pathologist assistance system, such as pathologist assistance system 110 of FIG. 1. Method 300 begins at 310, where the pathologist assistance system obtains a digitized tissue slide from a tissue slide database. As discussed above, digitized issue slides may be stored in a database and many different slides may be made for a single tissue sample, at different sizes and zoom levels. Analysis of all such slides for a tissue sample may be needed to perform an accurate diagnosis of the tissue, so while method 300 describes the analysis of a single digitized tissue slide, method 300 may be performed many times to complete a full diagnosis. Once the slide is received, the pathologist assistance system provides the digitized tissue slide as input to a tissue classification module.

At 320, the pathologist assistance system determines based on output from a tissue classification module, a type of tissue of shown in the digitized tissue slide. The tissue classification module includes a tissue classification model, which in this example is used to identify human anatomy and so is trained on labeled images of human anatomy. In some embodiments of method 300 the tissue classification module uses pattern recognition to determine a part of human anatomy associated with the digitized tissue slide. In other examples, the tissue classification module may instead be used to identify animal anatomy. The tissue classification model can identify a type of tissue shown in the digitized tissue slide. The tissue classification module can then verify that the pathologist assistance system includes a tumor classification for the type of tissue identified. If so, the tissue classification module passes the digitized tissue slide to a tumor classification module with an indication of the type of tissue shown in the digitized tissue slide.

At 330, the pathologist assistance system determines, based on output from a tumor classification model for the type of tissue, a ROI of the digitized tissue slide. In some embodiments of method 300 the tumor classification model is a convolutional neural network. The ROI corresponds to a section of the digitized tissue slide determined to be a tumor by the tumor classification model. The tumor classification model uses a binary mask to identify the ROI within the digitized tissue slide. The binary mask is configured to display only the cancerous cells within the digitized tissue slide. When only the cancerous cells are displayed, the tumor classification module can perform various operations on the cancerous cell-only display to estimate the size and stage of the tumor depicted in the ROI. In general, the ROI corresponds to a region thought to be tumorous by the tumor classification model, but a further diagnosis by a qualified pathologist may be beneficial to confirming if the ROI shows a tumor or does not.

At 340, the pathologist assistance system generates a classified slide showing the ROI of the digitized tissue slide and an estimated diameter of the ROI. As discussed, the tumor classification module can perform various operations to estimate the size (in diameter) of the ROI. This information can be used by the pathologist assistance system to generate a classified slide that highlights the ROI within the classified slide and displays the estimated size of the ROI. An example of such a classified slide is classified slide 210 of FIG. 2.

At 350, the pathologist assistance system displays on an image display unit, the classified slide and user interface (UI) elements enabling a pathologist to enter input related to the classified slide. In general, the pathologist may use the information displayed to assist in making a diagnosis of the tissue shown in the digitized tissue slide. User interface 200 of FIG. 2 is an example of such a display. In some embodiments of method 300 the UI elements allow the pathologist to redefine the ROI or change a classification of the ROI, such as by redrawing the lines of the ROI or indicating a ROI as entirely non-tumorous.

At 360, the pathologist assistance system optionally receives, from the pathologist, input related to the classified slide. In some embodiments of method 300 the input related to the classified slide is a correction to the classified slide as described above. However, in other embodiments of method 300, the input related to the classified slide is a verification of the ROI as determined by the tumor classification model.

At 370, the pathologist assistance system optionally updates the classified slide based on the input received from the pathologist. If the input related to the classified slide is a correction to the classified slide, the correction to the classified slide can be used to update the tumor classification model. In general, updating the tumor classification model may involve changing parameters of the machine learning to alter the data processing operations of the machine learning model. Updating the tumor classification model may also involve retraining the tumor classification model with the correction to the classified slide included in the training data.

If the input related to the classified slide is a correction to the classified slide, method 300 can further include applying the correction to the classified slide and storing the classified slide in classified slide storage. Such storage of classified slides can be later used to retrain or modify the tumor classification model that was used to identify the ROI.

Figure 4:
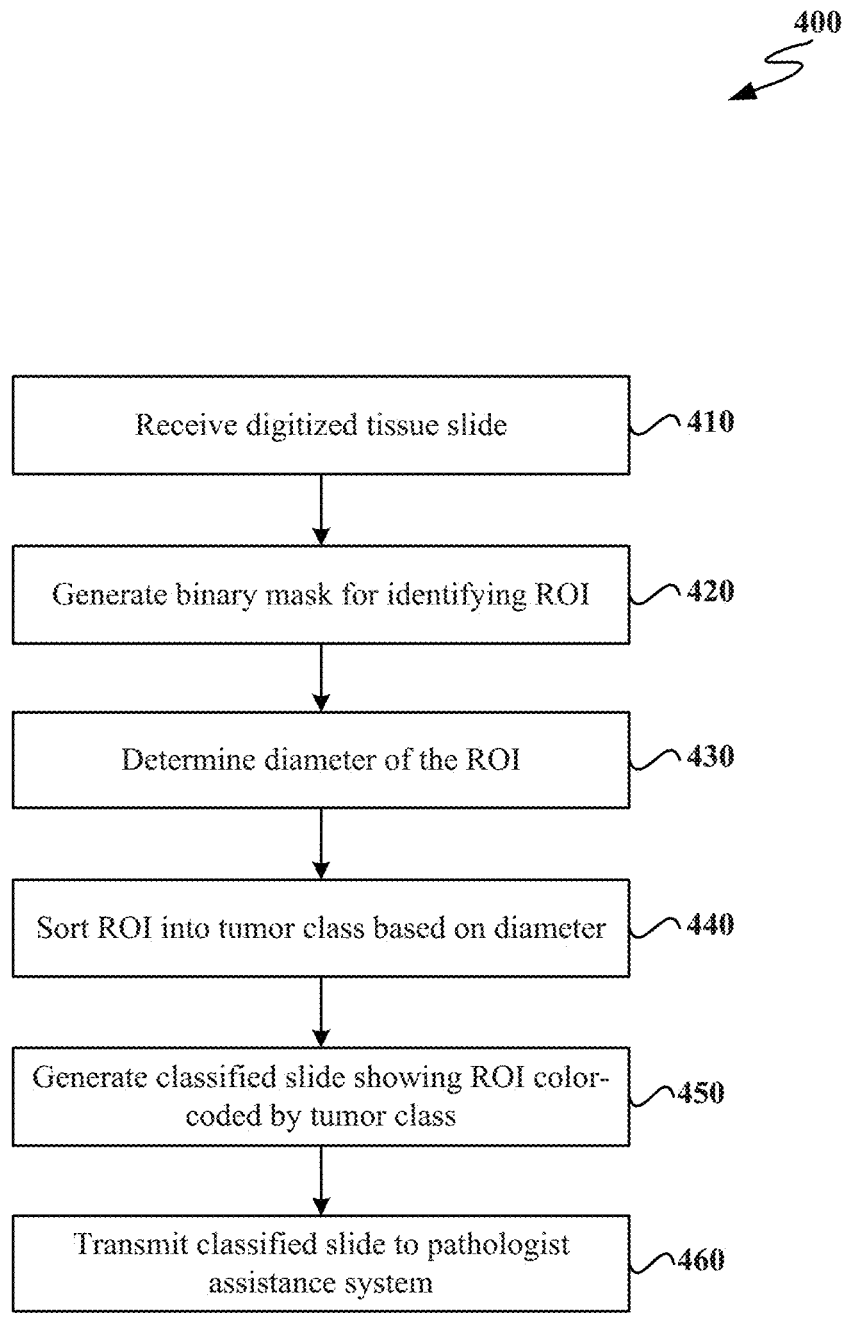
FIG. 4 is a flow chart of an example method for detecting and classifying tumor regions by a tumor classification module.

FIG. 4 is a flow chart of an example method 400 for detecting and classifying tumor regions by a tumor classification model. Method 400 may be performed by a tumor classification module, such as tumor classification module 122 of FIG. 1. Method 400 begins at 410, where the tumor classification module receives from a pathologist assistance system, a digitized tissue slide. The digitized tissue slide may have been obtained from a digitized tissue slide database. The digitized tissue slide may have been previously analyzed by a tissue classification model and so may include an indication of the tissue shown in the digitized tissue slide. Some embodiments of method 400 further include receiving, from the pathologist assistance system, an indication of a biomarker used to stain the digitized tissue slide and selecting a tumor classification model to analyze the digitized tissue slide based on the biomarker used. In general, a biomarker is an agent used to prepare a tissue slide for analysis. Different agents may be used to enable analysis of different features of the depicted tissue sample. The tumor classification module may use the identified biomarker to select a tumor classification model for both the type of tissue and the biomarker used.

At 420, the tumor classification module generates a binary mask, wherein the binary mask indicates a ROI in the digitized tissue slide. In general, binary masks may be used in computerized graphics to isolate certain visual imagery. In this case, based on output from the tumor classification model, the tumor classification module creates a binary mask that isolates the tumor cells shown in the digitized tissue slide by filtering out the non-tumorous cells. The result is an image which includes only the regions of continuous tumor cells, which are ROI.

At 430, the tumor classification module determines a diameter of the ROI based on an ellipse fitted to match the ROI. The stage of a tumor may be established by using the size (in this case, diameter) of the tumor. In this example, the tumor classification module may fit an ellipse to the ROI to estimate diameter. In general, the tumor classification module generates an ellipse and can resize, rotate, re-proportion or otherwise transform the ellipse to fit the ROI. An ellipse has two axes, a long axis and a short axis. At the point where the ellipse completely covers the ROI, the tumor classification module determines the longer axis of the ellipse and uses the length of the longer axis as an estimate for ROI diameter.

At 440, the tumor classification module sorts the ROI into a tumor class based on the diameter of the ROI, wherein the tumor class indicates a stage of tumors in the tumor class. As discussed, the size of tumor can be used to determine the stage of the tumor. Using the estimate diameter determined at 430, the tumor classification module can further estimate a stage of the tumor, and so sort the ROI into a tumor class corresponding to that stage. Some embodiments of method 400 further include segmenting the ROI based on size.

At 450, the tumor classification module generates based on the ROI, a classified slide, wherein the classified slide shows the ROI as color-coded based on the tumor class associated with the ROI. For example, ROI determined to be tumors of a first stage may be red, while ROI determined to be tumors of a second stage may be yellow, and so on. Color-coding the ROI may assist a pathologist in using the classified slide by making it easier to distinguish between ROI. In some embodiments of method 400, the classified slide shows each ROI as an overlay on the classified slide. To generate the classified slide, the tumor classification module may combine the image which includes only the regions of continuous tumor cells described above with the original digital slide image. By outlining the tumor cells-only image in certain colors the color-coded effect may be achieved. Additionally, by tinting the color of the tumor cells-only image the overlay effect may be achieved.

At 460, the tumor classification module transmits to the pathologist assistance system, the classified slide. After transmission, the pathologist assistance system may provide the classified slide to a pathologist to assist in diagnosis of the digitized tissue slide. Some embodiments of method 400 further include receiving, from the pathologist assistance system, a correction to the classified slide made by a pathologist and updating the tumor classification model based on the correction to the classified slide.

Figure 5:
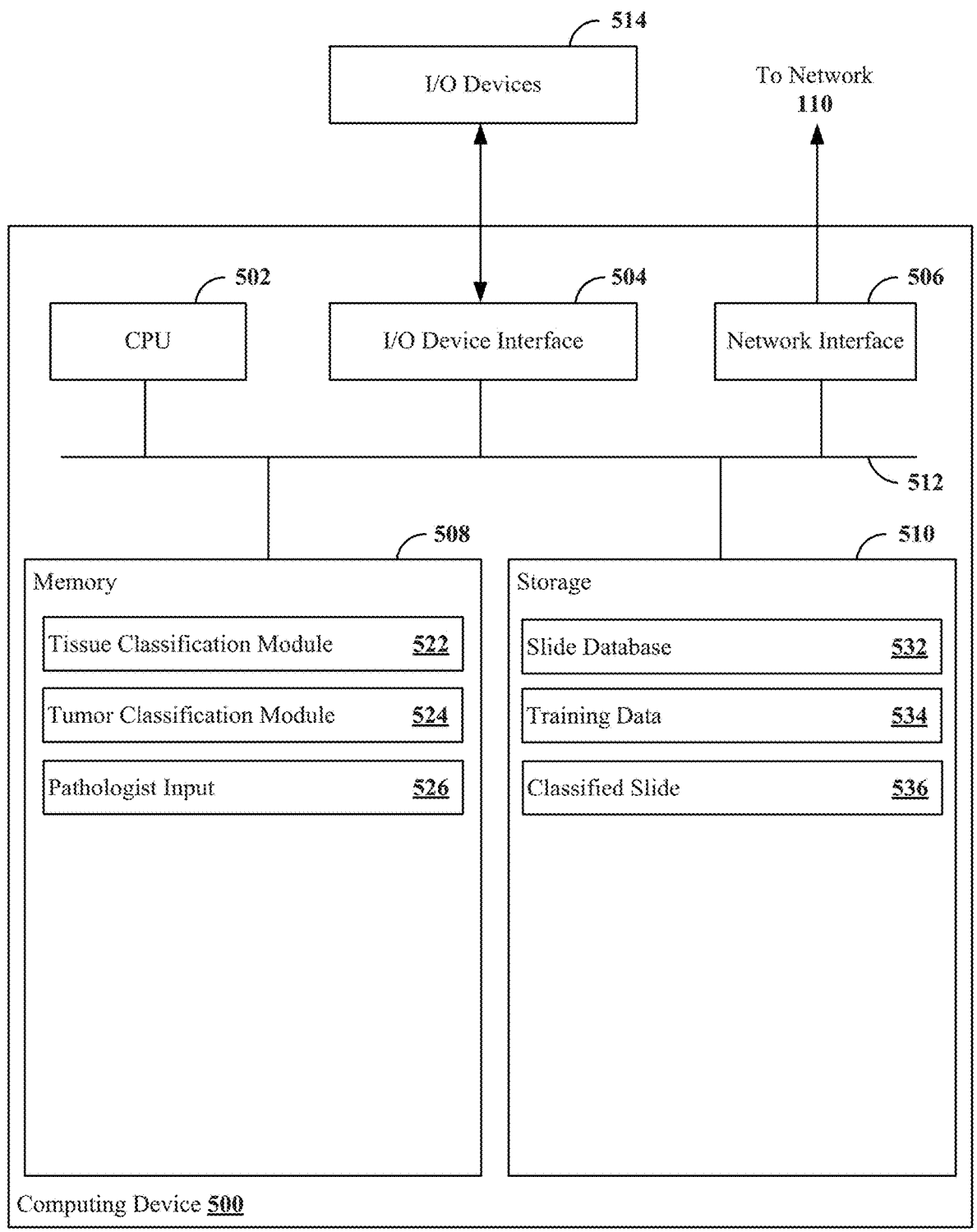
FIG. 5 is a block diagram of an example computing device the automatic detection and classification of tumors.

FIG. 5 is a block diagram of an example computing device 500 used for the automatic detection and classification of tumors. As shown, computing device 500 includes, without limitation, a central processing unit (CPU) 502, one or more input/output (I/O) device interfaces 504, which may allow for the connection of various I/O devices 514 (e.g., keyboards, displays, mouse devices, pen input, etc.) to computing device 500, network interface 506, memory 508, storage 510, and an interconnect 512.

The CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. The CPU 502 is included to be representative of a single CPU, multiple CPUs, a single CPU having multiple processing cores, and the like. The I/O device interface 504 may provide an interface for capturing data from one or more input devices integrated into or connected to the computing device 500, such as keyboards, mice, touchscreens, and so on. One such I/O device may be output display device 140 of FIG. 1. The memory 508 may represent a random access memory (RAM), while the storage 510 may be a solid state drive, for example. Although shown as a single unit, the storage 510 may be a combination of fixed and/or removable storage devices, such as fixed drives, removable memory cards, network attached storage (NAS), or cloud-based storage.

As shown, the memory 508 includes tissue classification module 522, tumor classification module 524 and pathologist input 526. Tissue classification module 522 and tumor classification module 524 are software objects executed based on instructions stored in the storage 510. Such instructions may be executed by the CPU 502. Pathologist input 526 is data temporarily resident in memory 508.

As shown, the storage 510 includes slide database 532, training data 534 and classified slide 536. Slide database 532, training data 534 and classified slide 536 may be used by software executing out of memory 508 to execute a method for automatically detecting and classifying tumors in a digitized tissue slide. In particular, tissue classification module 522 may use a tissue slide obtained from slide database 532 to identify a type of tissue in the slide. Based on the type of tissue, tumor classification module 524 may generate classified slide 536. Classified slide 536 may be shown to a pathologist user via I/O device interface 504 and I/O devices 514, and pathologist input 526 may be received in return. Pathologist input 526 may then be used to update tumor classification module 524. Training data 534 may have previously been used to train the machine learning models of tissue classification module 522 and tumor classification module 524.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be a graphics processing unit (GPU), such as those typically used in computer graphics and image processing. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automatically detecting and classifying tumor regions in a tissue image, comprising:
   obtaining a digitized tissue image;
   determining a type of tissue as shown in the digitized tissue image;
   determining, based on output from a tumor classification model for the type of tissue, a region of interest (ROI) of the digitized tissue image, wherein the ROI corresponds to a section of the digitized tissue image determined to be a tumor by the tumor classification model;
   generating a classified image showing the ROI of the digitized tissue image and a size of the ROI; and
   displaying the classified image on a user interface (UI).

2. The method of claim 1, further comprising:
   receiving, from a pathologist, input related to the classified image; and
   updating the classified image based on the input received from the pathologist.

3. The method of claim 2, wherein the input related to the classified image is a correction to the size, stage, or detection of the ROI as determined by the tumor classification model.

4. The method of claim 3, wherein the correction to the classified image is used to update the tumor classification model.

5. The method of claim 3, further comprising:
   applying the correction to the classified image; and
   storing the classified image in a classified image storage.

6. The method of claim 2, wherein the input related to the classified image is a verification of the ROI as determined by a tumor classification model.

7. The method of claim 1, wherein determining the size of the ROI includes determining a diameter of the ROI.

8. The method of claim 1, wherein the user interface further comprises user interface (UI) elements that allow a pathologist to redefine the ROI or change a classification of the ROI.

9. The method of claim 1, wherein the tumor classification model is a convolutional neural network.

10. The method of claim 1, further including a tissue classification module which uses pattern recognition to determine a part of human or animal anatomy associated with the digitized tissue image.

11. A system comprising:
    a processor; and
    a memory including instructions, which, when executed by the processor, cause the system to perform a method for automatically detecting and classifying tumor regions in a tissue image, the method comprising:
      obtaining a digitized tissue image;
      determining a type of tissue as shown in the digitized tissue image;
      determining, based on output from a tumor classification model for the type of tissue, a region of interest (ROI) of the digitized tissue image, wherein the ROI corresponds to a section of the digitized tissue image determined to be a tumor by the tumor classification model;
      generating a classified image showing the ROI of the digitized tissue image and a size of the ROI; and
      displaying the classified image on a user interface (UI).

12. The system of claim 11, the method further comprising:
    receiving, from a pathologist, input related to the classified image; and
    updating the classified image based on the input received from the pathologist.

13. The system of claim 12, wherein the input related to the classified image is a correction to the classified image.

14. The system of claim 13, wherein the correction to the classified image is used to update the tumor classification model.

15. The system of claim 11, wherein the user interface further comprises UI elements that allow a pathologist to redefine the ROI or change a classification of the ROI.

* * * * *